Aug. 2, 1932.  F. E. EDGREN  1,869,369
TRIMMING DEVICE
Filed March 28, 1930   3 Sheets-Sheet 1
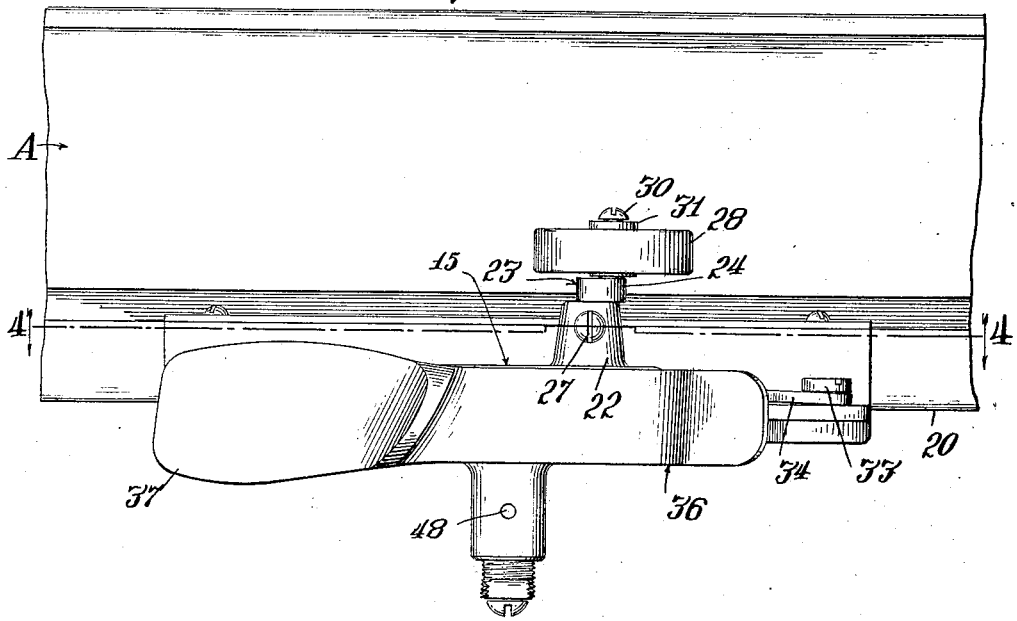
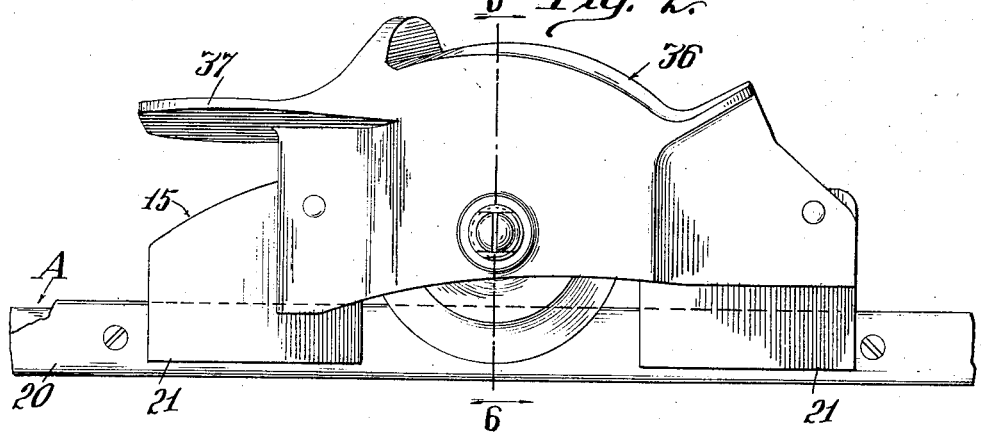
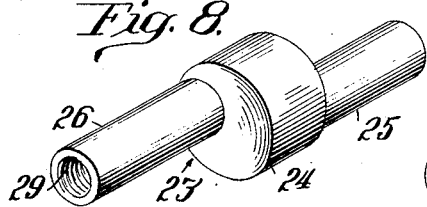
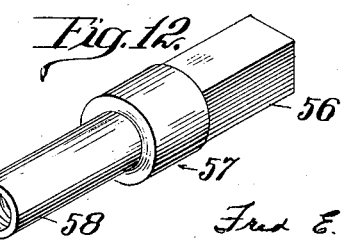
Inventor
Fred E. Edgren,
By George Heideman
Attorney.
Witnesses

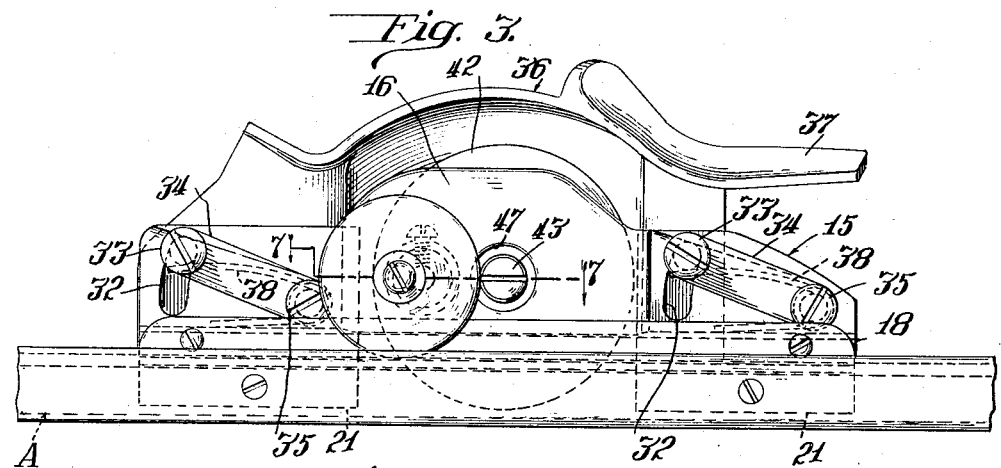
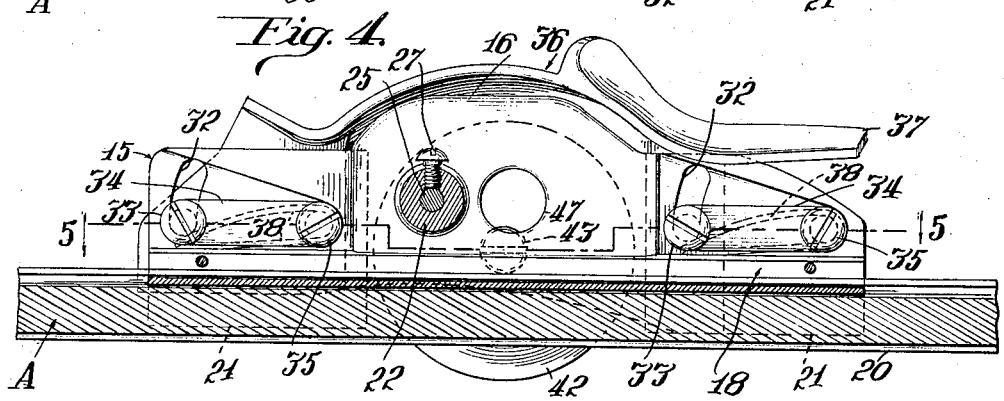
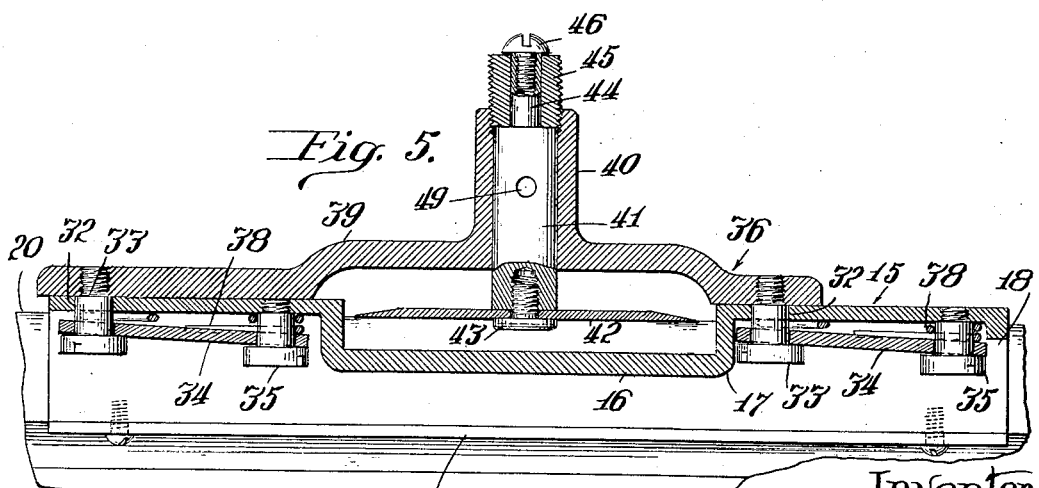

Aug. 2, 1932.  F. E. EDGREN  1,869,369
TRIMMING DEVICE
Filed March 28, 1930  3 Sheets-Sheet 3
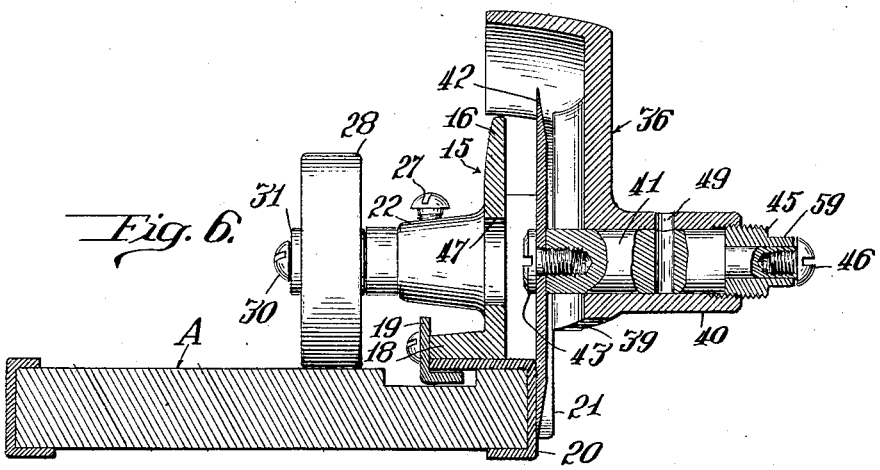
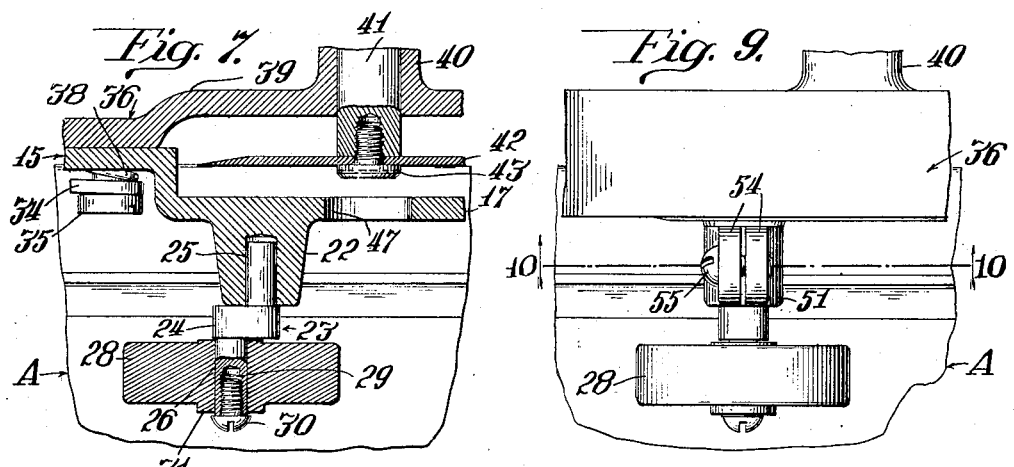
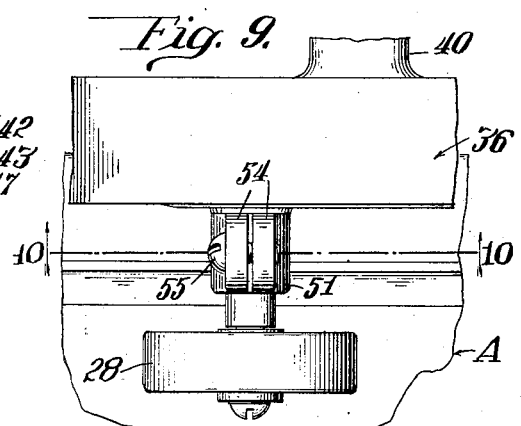
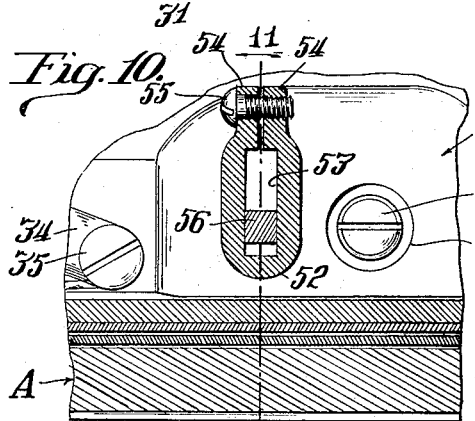
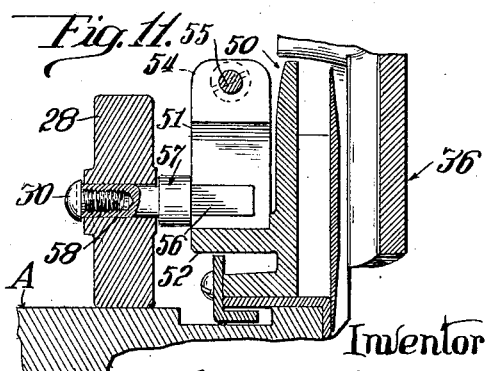

Patented Aug. 2, 1932

1,869,369

UNITED STATES PATENT OFFICE

FRED E. EDGREN, OF CHICAGO, ILLINOIS

TRIMMING DEVICE

Application filed March 28, 1930. Serial No. 439,581.

My invention relates to a cutting or trimming device more especially intended for trimming wall paper and adapted for use with the usual straightedges employed by wall paper trimmers and hangers.

My invention has for its object the provision of a device whereby a proper bearing on the straightedge will be provided so as to maintain the cutting disc or blade in proper uniform and close relation with the straightedge during cutting operations.

Another object of my invention is to provide a device whereby adjustment of the bearing may be readily made to adapt the device to variations in the thickness of straightedges so as to properly position the device with its cutting disc or blade relative to the paper to be trimmed.

Another object of my invention is to provide a device wherein adjustment of the cutting disc or blade relative to the vertical side or edge of the straightedge may be readily made; while at the same time providing a cutting disc or blade mounting which permits of easy removal or replacement of the disc or blade when occasion requires.

A further object of the invention is to provide a device wherein the outer shell or blade carrying case may have proper up and down movement and raising or tilting of the end of the trimmer from the straightedge track prevented during cutting or trimming operations.

The objects and advantages of my invention will be readily comprehended from the detailed description of the accompanying drawings, wherein:

Figure 1 is a top plan view of my improved trimmer shown applied to a straightedge of which only a portion is shown.

Figure 2 shows the trimmer in elevation as applied to a straightedge, as viewed from the outer or trimming side.

Figure 3 shows the trimmer in elevation, applied to a straightedge, as viewed from the inner straightedge side or side opposite to that shown in Figure 2; with the trimmer in non-cutting position.

Figure 4 is a longitudinal sectional elevation taken substantially on the line 4—4 of Figure 1, as viewed by the arrows.

Figure 5 is a sectional view taken substantially on the line 5—5 of Figure 4, as viewed by the arrows.

Figure 6 is a vertical cross-section taken substantially on the line 6—6 of Figure 2 as viewed by the arrows.

Figure 7 is a detail sectional view taken substantially on the line 7—7 of Figure 3, as viewed by the arrows.

Figure 8 is a perspective view of the bearing roller carrying spindle employed on the trimmer illustrated in Figure 1.

Figure 9 is a top plan view of a portion of the trimmer showing a modified form.

Figure 10 is a sectional view of the modified form and taken on the line 10—10 of Figure 9, as viewed by the arrows.

Figure 11 is a vertical sectional view taken substantially on the line 11—11 of Figure 10, looking in the direction of the arrows.

Figure 12 is a perspective view of the bearing roller carrying spindle employed in the modified form of the device shown in Figure 9.

The device comprises an inner case or body member 15 having a vertical portion 16, which is offset intermediate of the ends, as shown at 17, in Figure 5, and a laterally disposed base portion 18 (see Figure 6), the outer longitudinal edge whereof is provided with a right angular strip 19 which is preferably removably secured to the base portion as shown.

The device is particularly intended for use with the usual straightedge shown at A, which is provided with a channel or groove adjacent to one longitudinal edge which latter is provided with an angular metal strip 20, one side whereof overhangs the groove so as to provide a guideway for the device. The overhanging portion of the strip 20 is engaged by the right angular strip 19, as shown more clearly in Figure 6, thereby guiding the device in its travel, lengthwise of the straightedge during cutting operations.

The vertical wall portion 16, at opposite ends of the inner body member, is extended downwardly, beneath the lateral base portion 18, as shown at 21, 21; and these portions are intended to lap the strip 20 at the cutting edge of the straightedge as shown in Figure 2.

The inner member 15 is shown provided with a laterally disposed hub 22 adapted to receive one end of an eccentric or offset spindle 23, shown in Figure 8. This spindle 23, in the particular exemplification, consists of the enlarged intermediate portion 24, with the two arbor portions or pins 25 and 26 offset to opposite sides of the center of the portion 24; the pin 25 being inserted in the hub 22 and held against accidental movement by the set-screw 27; while the pin 26 is intended to receive the bearing roller 28 which rides along the top of the straightedge A, as shown in Figures 1, 6 and 7.

The end of pin 26 is shown provided with a threaded socket 29 for the purpose of receiving the screw 30 whereby the roller 28 is held in place; a suitable washer being employed as shown at 31, so as to allow the roller to freely rotate on the pin 26.

The inner case or member 15, by reason of the depending wall portions 21, 21, the straightedge track engaging angle member 19 and the inwardly extending bearing roller 28 will be firmly held on the straightedge against any sidewise tilting movement, thus ensuring a straight, true cut being made by the device.

With the eccentric bearing 23 for the roller, it is apparent that vertical adjustment of the bearing roller may be made upon releasing set-screw 27 so as to allow the roller carrying pin or portion 26 to be moved through a vertically disposed arc so as to either move the roller downward or upward as desired, thus adapting the device to straightedges varying in thickness.

The inner member 15, at opposite ends, is provided with the upwardly disposed and somewhat arcuate slots 32, 32, which freely receive the screws 33, which also extend through the ends of links 34, whose opposite ends are oscillatably secured to the inner member 15 by the screws 35.

The pins or screws 33 freely ride in the slots 32 and have their threaded ends screwed into tapped holes in the vertical wall of the outer case or hand operated member 36.

Member 36, therefore, is yieldingly secured to the inner case or straightedge engaging member 15, and is permitted to have vertical movement. The member 36, at top, is provided with a suitable hand engaging portion, as at 37.

In order to yieldingly hold the outer case or hand operated member upwardly and therefore also to return it to normal position, one or more suitable springs are employed, as for example shown at 38, 38; the springs being coiled about the screws 35, and one end bearing on the lateral body portion 18 of the inner member 15 while the other end of each spring bears upwardly against the respective screws 33, as shown in Figures 3 and 4. With the outer case or member secured to the inner case or member through the medium of the links 34, 34, it is evident that the outer case will be compelled to move uniformly and that a tilting of the outer case or member by pressure at one end will be prevented.

The outer case 36, intermediate of its ends, and coincident with the offset portion 17 of the inner case 15, is also offset outwardly as shown at 39, see Figures 5 and 7; the two offset portions forming a cutting disc or blade receiving chamber. The intermediate offset wall portion 39, adjacent to the lower edge, is provided with an outwardly disposed hub 40 which is adapted to receive and provide proper bearing for the arbor 41.

The arbor 41 at its inner end has the cutting blade or disc 42 secured thereto by means of screw 43, so that the disc will rotate with arbor 41. The outer end of the arbor 41 is reduced, as shown at 44, and extends through an adjusting thimble 45, and the outer end of this reduced portion has a threaded socket to receive screw 46 which maintains the operative relation between the arbor 41 and the thimble 45.

Thimble 45 is externally threaded and screws into the threaded end of the hub 40.

With the thimble 46 bearing on the shoulder formed by the reduced end 44 of the arbor 41, it is apparent that when the thimble is screwed further into the hub 40, the arbor 41 with the cutting disc 42 will be forced toward the inner case or member 15 and therefore bring the cutting disc 42 into intimate relation with the outer longitudinal edge of the straightedge. Upon screwing the thimble 45 outwardly, the arbor (by reason of screw 46) with the cutting blade, will move outwardly and therefore away from the straightedge.

In order that the cutting disc 42 may be easily removed for sharpening or replaced with a new blade, without necessity of dismantling the entire device, I show the inner case or member 15, at a point coincident with the blade or disc holding screw 43, when the outer hand grasping member 36 is in its normal raised position, provided with a screw-driver receiving opening 47, see Figure 4.

The hub 40 and the arbor 41 are also provided with small pin-receiving holes at 48 and 49, see Figures 1 and 5. When it is desired to remove the disc as above mentioned, the arbor 41 is positioned so as to bring its hole 49 into register with the hole 48 in the hub 40 and a nail or pin is inserted so as to hold the arbor against rotation while unscrewing or screwing the screw 43.

In operation, the device is applied to the track of the straightedge, as shown and described; the bearing roller is adjusted by turning the eccentric trunnion or spindle 23 in keeping with the thickness of the straightedge, so as to have the roller or bearing element 28 bear on the straightedge and thus prevent any sidewise movement or tilting of the device. The thimble 45 is also screwed inwardly or outwardly, in keeping with the thickness or width of the straightedge track so as to position the cutting disc or blade flush with the outer edge of the straightedge. Having placed the straightedge with the device in position on the paper or material to be trimmed, the operator then depresses the outer case 36 so as to bring the disc into contact with the material and slides the device lengthwise of the straightedge track. As soon as the operator releases pressure on the case 36, the latter with the cutting disc 42 will move upwardly out of cutting position through the action of the springs 38.

In Figures 9 to 12, I show a modified form of the bearing portion of the device and the method of adjustment.

The portion of the inner case or member 50 in general respects is similar to member 15 previously described, except that instead of the hub 22, the member 50 is provided with the vertical boss formation 51 which is merely attached at its bottom 52 to member 50, as shown in Figure 11. The boss 51 is provided with an elongated vertical slot 53 of rectangular shape; and the upper end of the boss formation is split to provide the two slightly spaced lobes 54, 54, having registering threaded holes to receive the screw 55 whereby the two portions of the boss formation may be drawn together.

The slot 53 is intended to receive the squared shank 56 of the spindle 57, shown in Figure 12, having the enlarged intermediate portion shown, with the opposite side of the intermediate portion provided with the roller receiving trunnion 58 which, like spindle 23, has its outer end provided with a tapped socket to receive the screw 30, whereby the bearing roller 28 is secured in place.

As is apparent from the construction shown, vertical adjustment of the bearing may be accomplished by loosening screw 55, allowing the two portions of the boss to spread, thus releasing the trunnion and permitting the latter to be moved upwardly or downwardly as required to position the roller so it will bear firmly on the straightedge.

With the device provided with the roller bearing as shown, the friction between the device and the straightedge track is reduced because the trimmer also rides on the roller.

In order that the blade-arbor controlling thimble or ferrule 45 may be easily manipulated, I prefer to reduce the outer end of the thimble and provide said end with flattened surfaces as shown at 59 in Figure 6, thus providing finger-grasping portions.

I prefer to provide the trimmer with adjustable anti-friction bearings as shown and have also shown the device provided with a pair of springs to yieldingly hold the outer case in normal position, but it is apparent that modifications may be made without departing from the spirit of my invention which has been described in terms employed merely as terms of description and not as terms of limitation.

What I claim is:

1. A trimmer of the character described comprising a straightedge track engaging member; a cutting blade carrying member; a pair of oscillatably mounted links on the first member whereby the second member is movably secured to the first member; means whereby the second member is yieldingly held in raised position; and means, extending laterally from the first member, adapted to have bearing relation with the upper face of the straightedge.

2. A trimmer of the character described comprising a straightedge track engaging member; a cutting blade carrying member; means whereby the two members are operatively secured together and the second mentioned member made to move in a downwardly slanting direction; and means disposed laterally from the first member and arranged to engage the upper face of the straightedge, said means being vertically adjustable.

3. A trimmer of the character described comprising a straightedge track engaging member provided on its outer side with a lateral extension; straightedge engaging means adjustably mounted in said extension; a cutting blade carrying member arranged in lapping relation with the side of the first mentioned member; a pair of links pivotally connected to both of said members whereby uniform movement of the second member is induced; and means whereby the second member is returned to raised position.

4. A device of the character described comprising a straightedge engaging member having a horizontally extending base adapted to interengage with the straightedge track and a vertical portion disposed beneath said horizontal base to lap the outer edge of the straightedge, said member also having a laterally disposed and vertically adjustable roller carrying spindle; a cutting blade carrying member arranged in lapping relation with the outer side of the first mentioned member; a pair of links arranged at opposite ends of the device and each pivotally connected to both of said members whereby uniform movement of the second member is induced; and spring means whereby the second member is automatically returned to raised position.

5. A device of the character described comprising a straightedge engaging member provided with a horizontal base disposed toward one side and adapted to interengage with the straightedge track and having portions depending beneath the base at one side adapted to lap the outer edge of the straightedge, the side wall of the member above the base and adjacent opposite ends having vertically disposed slots extending therethrough and also provided with a lateral extension; a straightedge engaging element adjustably secured to said extension; a hand operated member arranged in lapping relation with the outer side of the first member; a pair of links pivotally secured at the ends to both of said members with the pivotal connection for the second member extending through the vertical slots of the first member; spring means for yieldingly holding the second member in raised position; a cutting disc carrying arbor rotatably mounted in the side wall of the second member; and means whereby lengthwise adjustment of the arbor may be made and the latter held in its adjusted positions.

6. In a device of the character described, a depressible hand operated member provided with a laterally extending hub, the outer end whereof is internally threaded; an arbor rotatably mounted in said hub and having a reduced outer end provided with a tapped opening in said end; a cutting disc removably secured to the inner end of said arbor so as to rotate with the arbor; an externally threaded thimble arranged on the reduced outer end of the arbor and adjustably screwing into the threaded outer end of the hub; and a threaded member in the tapped opening in the reduced end of the arbor and engaging the outer end of said thimble whereby lengthwise in and out of adjustment of the arbor through rotation of the thimble may be made and the arbor held against lengthwise movement.

FRED E. EDGREN.